(12) United States Patent
Jia et al.

(10) Patent No.: US 12,344,745 B2
(45) Date of Patent: Jul. 1, 2025

(54) SILICONE COMPOSITION AND A METHOD FOR ADDITIVE MANUFACTURING A SILICONE ELASTOMER ARTICLE

(71) Applicant: ELKEM SILICONES SHANGHAI CO., LTD., Shanghai (CN)

(72) Inventors: Liya Jia, Shanghai (CN); Yuanzhi Yue, Shanghai (CN)

(73) Assignee: ELKEM SILICONES SHANGHAI CO., LTD., Shanghai (CN)

( * ) Notice: Subject to any disclaimer, the term of this patent is extended or adjusted under 35 U.S.C. 154(b) by 539 days.

(21) Appl. No.: 17/287,869

(22) PCT Filed: Oct. 26, 2018

(86) PCT No.: PCT/CN2018/112180
§ 371 (c)(1),
(2) Date: Apr. 22, 2021

(87) PCT Pub. No.: WO2020/082359
PCT Pub. Date: Apr. 30, 2020

(65) Prior Publication Data
US 2021/0395525 A1 Dec. 23, 2021

(51) Int. Cl.
*B33Y 10/00* (2015.01)
*B33Y 70/00* (2020.01)
(Continued)

(52) U.S. Cl.
CPC ............... *C08L 83/04* (2013.01); *B33Y 70/00* (2014.12); *B29C 64/106* (2017.08);
(Continued)

(58) Field of Classification Search
None
See application file for complete search history.

(56) References Cited

U.S. PATENT DOCUMENTS 5,036,131 A  7/1991 Himstedt
6,251,990 B1  6/2001 Meguriya
(Continued)

FOREIGN PATENT DOCUMENTS

CN  1372610 A  10/2002
CN  1738867 A  2/2006
(Continued)

OTHER PUBLICATIONS

International Search Report of International Patent Application No. PCT/CN2018/112180 dated Jul. 25, 2019.

*Primary Examiner* — Yung-Sheng M Tsui
*Assistant Examiner* — Melody Tsui
(74) *Attorney, Agent, or Firm* — McBee, Moore & Vanik IP, LLC

(57) ABSTRACT

The invention relates to a silicone composition and a method for additive manufacturing a silicone elastomer article. The silicone composition is crosslinkable through addition reactions and comprise:
(A) at least one organopolysiloxane compound A comprising, per molecule at least two $C_2$-$C_6$ alkenyl radicals bonded to silicon atoms,
(B) at least one organohydrogenopolysiloxane compound B comprising, per molecule, at least two hydrogen atoms bonded to an identical or different silicon atom,
(C) at least one catalyst C consisting of at least one metal or compound, from the platinum group,
(D) at least one reinforcing silica filler D which is at least partly surface treated,
(E) at least one organopolysiloxane having an aryl group E and
(F) optionally at least one crosslinking inhibitor F.

19 Claims, 1 Drawing Sheet

(51) Int. Cl.
    *C08L 83/04*     (2006.01)
    *B29C 64/106*     (2017.01)
    *B29K 83/00*     (2006.01)
    *C08G 77/12*     (2006.01)
    *C08G 77/20*     (2006.01)

(52) U.S. Cl.
    CPC ........... *B29K 2083/00* (2013.01); *B33Y 10/00* (2014.12); *C08G 77/12* (2013.01); *C08G 77/20* (2013.01)

(56) References Cited

U.S. PATENT DOCUMENTS

| | | |
|---|---|---|
| 6,354,620 B1 | 3/2002 | Budden et al. |
| 6,511,754 B1 | 1/2003 | Bohin et al. |
| 9,434,857 B2 * | 9/2016 | Ou .................... B01J 31/2282 |
| 9,714,344 B2 | 7/2017 | Mayumi |
| 2006/0128881 A1 | 6/2006 | Chimie |
| 2009/0111931 A1 | 4/2009 | Chimie |
| 2012/0123049 A1 | 5/2012 | Koshikawa et al. |
| 2012/0232219 A1 | 9/2012 | Kato et al. |
| 2017/0233612 A1 | 8/2017 | Han et al. |
| 2017/0283655 A1 | 10/2017 | Kenney |
| 2018/0186076 A1 | 7/2018 | Backer |
| 2019/0040204 A1 * | 2/2019 | Beyer .................... C08G 77/12 |
| 2019/0055420 A1 | 2/2019 | Beyer et al. |
| 2019/0270240 A1 | 9/2019 | Wolf |
| 2020/0108548 A1 | 4/2020 | Frances |
| 2021/0238418 A1 | 8/2021 | Marquette |
| 2021/0276077 A1 * | 9/2021 | Hearon .................... B28B 1/24 |

FOREIGN PATENT DOCUMENTS

| | | |
|---|---|---|
| CN | 101107323 A | 1/2008 |
| CN | 102604581 A | 7/2012 |
| CN | 102675884 A | 9/2012 |
| CN | 105238064 A | 1/2016 |
| CN | 105637035 A | 6/2016 |
| CN | 105838319 A | 8/2016 |
| CN | 105899616 A | 8/2016 |
| CN | 106317898 A | 1/2017 |
| CN | 104559196 B | 5/2017 |
| CN | 106804110 A | 6/2017 |
| CN | 107141426 A | 9/2017 |
| CN | 107429126 A | 12/2017 |
| CN | 107974089 A | 5/2018 |
| CN | 108699421 A | 10/2018 |
| EP | 1251149 A1 | 10/2002 |
| EP | 3321074 A1 | 5/2018 |
| EP | 3911707 A1 | 11/2021 |
| JP | 2000-136307 B2 | 5/2000 |
| JP | 2000136307 A | 5/2000 |
| JP | 2017-039848 B2 | 2/2017 |
| JP | 2017039848 A | 2/2017 |
| JP | 2018-500192 B2 | 1/2018 |
| JP | 2018500192 A | 1/2018 |
| JP | 2022505722 A | 1/2022 |
| KR | 102549067 B1 | 6/2023 |
| WO | 03035763 A1 | 5/2003 |
| WO | 2015068859 A1 | 5/2015 |
| WO | 2015107333 A1 | 7/2015 |
| WO | 2016071241 A1 | 5/2016 |
| WO | 2016188930 A1 | 12/2016 |
| WO | 2017040874 A1 | 3/2017 |
| WO | 2017081028 A1 | 5/2017 |
| WO | 2017121733 A1 | 7/2017 |

* cited by examiner

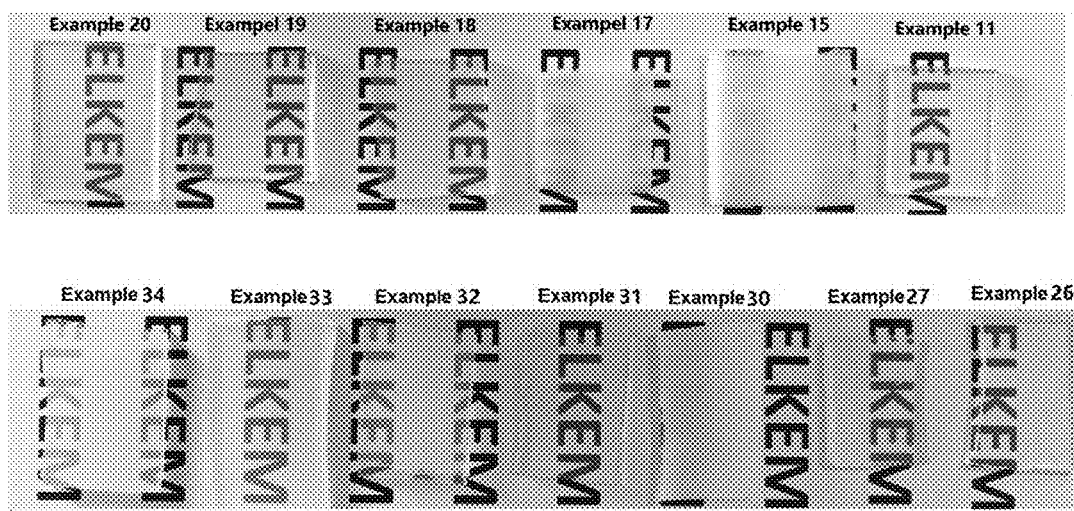

SILICONE COMPOSITION AND A METHOD FOR ADDITIVE MANUFACTURING A SILICONE ELASTOMER ARTICLE

CROSS-REFERENCE TO RELATED APPLICATIONS

This application is the National Stage entry of International Application No. PCT/CN2018/112180 filed Oct. 26, 2018.

BACKGROUND

Technical Field

The invention relates to a silicone composition and a method for additive manufacturing a three dimensional elastomer silicone article. The elastomer silicone article is built up layer by layer by printing the silicone composition crosslinkable by addition reactions with a 3D printer.

Description of Related Art

Additive manufacturing techniques covers different technologies whose common features is an automotive additive buildup of layers of the shaped parts. Addition crosslinking silicone compositions have already been used in additive manufacturing methods to produce a three dimensional elastomer silicone article or part. Such silicone compositions are disclosed in, for example, CN104559196B, CN105238064A, CN105637035A and CN107141426A.

WO2015/107333 discloses a 3D printer that comprises an x-y-z gantry robot that includes a material delivery system comprising a mixing chamber, the mixing chamber further comprising a mixer body, a mixer nozzle and a mixing paddle. The material delivery system further comprises a plurality of syringe pumps connectable to the mixing chamber delivering streams of the constituents of a printing material to the mixing chamber. The mixing paddle is threaded through the port block into the mixing chamber, and is rotated by means of a motor to mix the printing material prior to its extrusion from the mixer nozzle. Addition crosslinking silicone compositions comprising polydimethylsiloxane chains, filler, catalyst and crosslinker. By varying the amount of these components the mechanical properties of the elastomer can be adapted but the desired properties also depend on the set time and viscosity of the silicone compositions and the speed at which the material is printed.

There is a need to provide an additive manufacturing method for the efficient production of high quality shaped silicone parts. One of the main issues linked to the additive manufacturing techniques is that during the layer by layer production each layer has to retain its shape. As the height of product increases the lower layers would not hold their shape and flow and there may be a distortion or a collapse of the structure. As a result improper shape silicone parts are obtained.

Different solutions have been proposed. WO2016071241 discloses the use of silicone compositions with a viscosity measured at 25° C. and at a shear rate of 0.5 $s^{-1}$ of at least 10 Pa·s and the use of irradiation with independently spatially controllable electromagnetic energy to crosslink or incipient crosslink the silicone composition after application of the silicone composition to prevent running.

WO2016188930 discloses a method where after the deposition of each layer the pre-structure formed is cured on an oven.

WO2017040874 discloses a method where after printing each layer is at least partially cured by heating prior to the deposition of the subsequent layer.

All these above solutions need the implementation of heating or electromagnetic radiation at the same time or between the steps of printing the layers. 3D printers are complexified and printing speed is affected.

Furthermore, WO2017081028A1 and WO2017121733A1 from Wacker teach that the print head technical parameters compatible with the particular rheological properties of the material to be printed, it is possible to obtain satisfactory printing results. And both used one or more compounds selected from epoxy group-functional compound, (poly) ether group-functional compound and (poly) ester group-functional compound as rheological agent to adjust and improve the thixotropic properties.

U.S. Pat. No. 5,036,131 discloses a silicone dispersion, having improved toughness and thixotropic characteristics, that cures to an elastomer upon exposure to the air. The silicone dispersion used herein is based on a hydroxyl end blocked polydiorganosiloxane, aluminum trihydrate and moisture activated curing system. In order to obtain the thixotropic nature of the coating, it is required to include in the silicone dispersion the siloxane (2) having hydroxyl end blocking and phenyl or 3,3,3-trifluoropropyl radicals in combination with the untreated fume silica.

SUMMARY

It is an object of the present invention to provide a method that allows a time efficient production of a three dimensional silicone elastomer part.

It is also an object of the present invention to obtain 3D elastomer parts with excellent manufacture accuracy.

It is also an object of the present invention to provide a method for additive manufacturing of silicone elastomers objects with reduced or even without collapse or deformation of the layers at room temperature before curing.

It is also an object of the present invention to obtain 3D elastomer parts with excellent mechanical properties and thermal resistance.

In one aspect, the present invention is a method for additive manufacturing a silicone elastomer article comprising the steps of:

1) printing a first silicone composition on a substrate with a 3D printer selected from an extrusion 3D printer or a material jetting 3D printer to form a first layer, 2) printing a second silicone composition on the first or previous layer with the said 3D printer to form a subsequent layer and 3) optionally repeating step 2) with independently selected silicone composition for any additional layer needed and 4) allowing the first and subsequent layers to crosslink, optionally by heating, to obtain a silicone elastomer article, wherein at least one layer of said silicone composition is the inventive silicone composition as defined below.

BRIEF DESCRIPTION OF THE DRAWINGS

FIG. 1 depicts embodiments as described herein.

DETAILED DESCRIPTION OF A PREFERRED EMBODIMENT

In another aspect, the present invention is a silicone composition for additive manufacturing a silicone elastomer article, characterized in that the said silicone composition is crosslinkable through addition reactions and comprises:

(A) at least one organopolysiloxane compound A comprising, per molecule at least two $C_2$-$C_6$ alkenyl radicals bonded to silicon atoms, (B) at least one organohydrogenopolysiloxane compound B comprising, per molecule, at least two hydrogen atoms bonded to an identical or different silicon atom, (C) at least one catalyst C consisting of at least one metal or compound, from the platinum group, (D) at least one reinforcing silica filler D which is at least partly surface treated, (E) at least one organopolysiloxane having an aryl group E and (F) optionally at least one crosslinking inhibitor F.

It is to the credit of the inventors to have found that the inventive addition crosslinking silicone compositions have the adequate rheological properties which are suitable for 3D printers and helpful to decrease or avoid collapse or deformation of the objects at room temperature before complete curing Regarding the rheological properties, it is not only the fact of the viscosity index which is commonly used and disclosed as the ratio between the slow shear rate viscosity to the high shear rate viscosity of a non-Newtonian body. It is also related to the speed rise of the viscosity when decreasing the shear rate.

Therefore, a parameter "thixotropic index" is herein introduced to assess the rheological property and it is expressed as the ratio between the slow shear rate viscosity to the high shear rate viscosity of a non-Newtonian body. The measurement for this parameter is described below in the experimental part of the instant application.

In the first aspect, the present invention is a method for additive manufacturing a silicone elastomer article.

In the first step, the layer of the first addition-crosslinking silicone composition is printed on a substrate such that the layer is formed on the substrate. The substrate is no limited and may be any substrate. The substrate can support the 3D article during its method of manufacturing as for example the substrate plate of the 3D printer. The substrate can be rigid or flexible and can be continuous or discontinuous. The substrate may itself be supported, for example by a substrate table or plate, such that the substrate needs not to have rigidity. It may also be removable from the 3D article. Alternatively, the substrate can be physically or chemically bond to the 3D article. In one embodiment, the substrate may be in silicone.

The layer formed by printing the first addition-crosslinking silicone composition may have any shape and any dimension. The layer can be continuous or discontinuous.

In the second step, a subsequent layer is formed by printing a second silicone composition on the previous layer, formed in the first step, with an extrusion 3D printer or a material 3D jetting printer. The extrusion 3D printer and the material 3D jetting printer may be the same as or different from the extrusion 3D printer or a material 3D jetting printer utilized in step 1).

The second addition-crosslinking silicone composition may be the same as or different from the first addition-crosslinking silicone composition.

The subsequent layer formed by printing the second addition-crosslinking silicone composition may have any shape and any dimension. The subsequent layer can be continuous or discontinuous.

In the third step, the second step is repeated to obtain as many layers as needed.

In the fourth step, by allowing the layers to complete crosslinking, optionally by heating, a silicone elastomer article is obtained. Crosslinking can be completed at ambient temperature. Usually ambient temperature refers to a temperature between 20 and 25° C.

Heating may be used to accelerate the crosslinking or curing of the layers. A thermal cure after printing can be done at a temperature between 50 and 200° C., preferably between 60 and 100° C., in order to achieve complete cure or crosslinking faster.

In this document the term "layer" may relate to the layers at any stage of the method, first or previous or subsequent layer. The layers can be each of various dimensions, including thickness and width. Thickness of the layers can be uniform or may vary. Average thickness is related to the thickness of the layer immediately after printing.

In an embodiment, the layers independently have a thickness of from 10 to 3000 μm, preferably from 50 to 2000 μm, more preferably from 100 to 800 micrometers and most preferably from 100 to 600 micrometers In a particular embodiment, no energy source as heat or radiation is applied during or between steps 1) to 3) prior to the printing of at least 10, preferably 20 layers.

3D Printing Disclosure 3D printing is generally associated with a host of related technologies used to fabricate physical objects from computer generated, e.g. computer-aided design (CAD), data sources.

This disclosure generally incorporates ASTM Designation F2792-12a, "Standard Terminology for Additive Manufacturing Technologies Under this ASTM standard, "3D printer" is defined as "a machine used for 3D printing" and "3D printing" is defined as "the fabrication of objects through the deposition of a material using a print head, nozzle, or another printer technology."

"Additive manufacturing (AM)" is defined as "a process of joining materials to make objects from 3D model data, usually layer upon layer, as opposed to subtractive manufacturing methodologies. Synonyms associated with and encompassed by 3D printing include additive fabrication, additive processes, additive techniques, additive layer manufacturing, layer manufacturing, and freeform fabrication." Additive manufacturing (AM) may also be referred to as rapid prototyping (RP). As used herein, "3D printing" is generally interchangeable with "additive manufacturing" and vice versa.

"Printing" is defined as depositing of a material, here a silicone composition, using a print head, nozzle, or another printer technology.

In this disclosure "3D or three dimensional article, object or part" means an article, object or part obtained by additive manufacturing or 3D printing as disclosed above.

In general, all 3D printing processes have a common starting point, which is a computer generated data source or program which may describe an object. The computer generated data source or program can be based on an actual or virtual object. For example, an actual object can be scanned using a 3D scanner and scan data can be used to make the computer generated data source or program. Alternatively, the computer generated data source or program may be designed from scratch.

The computer generated data source or program is typically converted into a standard tessellation language (STL) file format; however other file formats can also or additionally be used. The file is generally read into 3D printing software, which takes the file and optionally user input to separate it into hundreds, thousands, or even millions of "slices." The 3D printing software typically outputs machine instructions, which may be in the form of G-code, which is read by the 3D printer to build each slice. The machine instructions are transferred to the 3D printer, which then builds the object, layer by layer, based on this slice information in the form of machine instructions. Thicknesses of these slices may vary.

An extrusion 3D printer is a 3D printer where the material is extruded through a nozzle, syringe or orifice during the additive manufacturing process. Material extrusion generally works by extruding material through a nozzle, syringe or orifice to print one cross-section of an object, which may be repeated for each subsequent layer. The extruded material bonds to the layer below it during cure of the material.

In one preferred embodiment, the method for additive manufacturing a three-dimensional silicone elastomer article uses an extrusion 3D printer. Silicone compositions are extruded through a nozzle. The nozzle may be heated to aid in dispensing the addition crosslinking silicone composition The average diameter of the nozzle defines the thickness of the layer. In an embodiment, the diameter of the layer is comprised from 50 to 3000 µm, preferably from 100 to 800 µm and most preferably from 100 to 500 µm.

The distance between the nozzle and the substrate is an important parameter to assure good shape. Preferably it is comprised from 60 to 150%, more preferably from 80 to 120% of the nozzle average diameter.

The addition-crosslinking silicone composition to be dispensed through the nozzle may be supplied from a cartridge-like system. The cartridge may include a nozzle or nozzles with an associated fluid reservoir or fluids reservoirs. It is also possible to use a coaxial two cartridges system with a static mixer and only one nozzle. Pressure will be adapted to the fluid to be dispensed, the associated nozzle average diameter and the printing speed.

Because of the high shear rate occurring during the nozzle extrusion, the viscosity of the addition-crosslinking silicone compositions is greatly lowered and so permits the printing of fine layers.

Cartridge pressure could vary from 1 to 20 bars, preferably from 2 to 10 bar and most preferably from 4 to 8 bar. When nozzle diameters lower than 100 µm are used, cartridge pressure shall be higher than 20 bars to get good material extrusion. An adapted equipment using aluminum cartridges shall be used to resist such a pressure.

The nozzle and/or build platform moves in the X-Y (horizontal plane) to complete the cross section of the object, before moving in the Z axis (vertical) plane once one layer is complete. The nozzle has a high XYZ movement precision around 10 µm. After each layer is printed in the X, Y work plane, the nozzle is displaced in the Z direction only far enough that the next layer can be applied in the X, Y work place. In this way, the object which becomes the 3D article is built one layer at a time from the bottom upwards.

As disclosed before, the distance between the nozzle and the previous layer is an important parameter to assure good shape. Preferably, it should be comprised from 60 to 150%, preferably from 80 to 120% of the nozzle average diameter.

Advantageously, printing speed is comprised between 1 and 50 mm/s, preferably between 5 and 30 mm/s to obtain the best compromise between good accuracy and manufacture speed.

"Material jetting" is defined as "an additive manufacturing process in which droplets of build material are selectively deposited." The material is applied with the aid of a printing head in the form of individual droplets, discontinuously, at the desired location of the work plane (Jetting). 3D apparatus and a process for the step-by-step production of 3D structures with a printing head arrangement comprising at least one, preferably 2 to 200 printing head nozzles, allowing the site-selective application where appropriate of a plurality of materials. The application of the materials by means of inkjet printing imposes specific requirements on the viscosity of the materials.

In a material 3D jetting printer one or a plurality of reservoirs are subject to pressure and being connected via a metering line to a metering nozzle. Upstream or downstream of the reservoir there may be devices which make it possible for multicomponent addition-crosslinking silicone compositions to be homogeneously mixed and/or to evacuate dissolved gases. One or a plurality of jetting apparatuses operating independently of one another may be present, to construct the elastomer article from different addition-crosslinking silicone compositions, or, in the case of more complex structures, to permit composite parts made from silicone elastomers and other plastics, Because of the high shear rate occurring in the metering valve during the jetting metering procedure, the viscosity of such addition-crosslinking silicone compositions is greatly lowered and so permits the jetting metering of very fine microdroplets. After the microdrop has been deposited on the substrate, there is a sudden reduction in its shear rate, and so its viscosity climbs again. Because of this, the deposited drop rapidly becomes of high viscosity again and permits the shape-precise construction of three-dimensional structures.

The individual metering nozzles can be positioned accurately in x-, y-, and z-directions to permit precisely targeted deposition of the silicone rubber drops on the substrate or, in the subsequent course of formation of shaped parts, on the addition-crosslinking silicone rubber composition which has already been placed and which optionally has already been crosslinked.

Contrary to other additive manufacturing methods, it is unnecessary to carry out the inventive method in an irradiated or heated environment to initiate the curing after each layer is printed to avoid the collapse of the structure. Thus, the irradiation and heating operation may be optional.

Typically, the 3D printer utilizes a dispenser, e.g. a nozzle or print head, for printing the particular curable silicone composition. Optionally, the dispenser may be heated before, during, and after dispensing the silicone composition. More than one dispenser may be utilized with each dispenser having independently selected properties.

In one embodiment, this method can use support material to build the object. If the object is printed using support material or rafts, after the printing process is complete, they are typically removed leaving behind the finished object.

Post-Process Options

Optionally, the resulting articles may be subjected to different post-processing regimes. In an embodiment, the method further comprises the step of heating the three-dimensional silicone article. Heating can be used to expedite cure. In another embodiment, the method further comprises the step of further irradiating the three-dimensional silicone article. Further irradiation can be used to expedite cure. In another embodiment, the method further comprises both steps of heating and irradiating the three-dimensional silicone article.

Optionally, post-processing steps can greatly improve the surface quality of the printed articles. Sanding is a common way to reduce or remove the visibly distinct layers of the model. Spraying or coating the surface of the elastomer article with a heat or UV curable RTV or LSR silicone composition can be used to get the right smooth surface aspect.

A surfacing treatment with a laser can also be done.

For medical applications, a sterilization of the final elastomer article can be obtained by heating the object at >100° C. or in an UV oven.

Addition Crosslinking Silicone Composition

The first and second addition-crosslinking silicone compositions may be the same as or different from one another, and when step 3) is repeated, independently selected addition-crosslinking silicone compositions may be utilized. In the inventive method, at least one layer of addition-crosslinking silicone compositions is the inventive silicone composition, which may be for example the first or second addition-crosslinking silicone composition or any other additional layer of the addition-crosslinking silicone composition. In an embodiment, all printed layers of the addition-crosslinking silicone compositions are inventive silicone compositions.

For purposes of brevity, the first and second addition-crosslinking silicone compositions, along with any other addition-crosslinking silicone compositions optionally utilized when step 3) is repeated, are referred to below collectively merely as "the addition-crosslinking silicone composition" or "the silicone compositions".

Organopolysiloxane A

According to a particularly advantageous mode, the organopolysiloxane A comprising, per molecule, at least two $C_2$-$C_6$ alkenyl radicals bonded to silicon atoms, comprises:
(i) at least two siloxyl units (A.1), which may be identical or different, having the following formula:

in which:
a=1 or 2, b=0, 1 or 2 and a+b=1, 2 or 3;
the symbols W, which may be identical or different, represent a linear or branched $C_2$-$C_6$ alkenyl group,
and the symbols Z, which may be identical or different, represent a monovalent linear, branched or cyclic alkyl group containing from 1 to 30 carbon atoms, preferably from 1 to 8 carbon atoms, that may be unsubstituted or substituted by one or more halogen atoms such as fluorine, chlorine and bromine atoms and/or by one or more aryl group such as phenyl, and even more preferentially chosen from the group formed by methyl, ethyl, propyl, 3,3,3-trifluoropropyl,
(ii) and optionally at least one siloxyl unit having the following formula:

 (A.2)

in which:
c=0, 1, 2 or 3,
the symbols $Z^1$, which may be identical or different, represent a monovalent linear, branched or cyclic alkyl group containing from 1 to 30 carbon atoms, preferably from 1 to 8 carbon atoms, that may be unsubstituted or substituted by one or more halogen atoms such as fluorine, chlorine and bromine atoms and/or by one or more aryl group such as phenyl, and even more preferentially chosen from the group formed by methyl, ethyl, propyl, 3,3,3-trifluoropropyl.

Advantageously, Z and $Z^1$ are chosen from the group formed by methyl, ethyl and propyl, and W is chosen from the following list: vinyl, propenyl, 3-butenyl, 5-hexenyl, 9-decenyl, 10-undecenyl, 5,9-decadienyl and 6-11-dodecadienyl, and preferably, W is a vinyl.

In a preferable embodiment, in formula (A.1) a=1 and a+b=2 or 3 and in formula (A.2) c=2 or 3.

These organopolysiloxanes A may have a linear, branched or cyclic structure.

When they are linear polymers, they are essentially formed from siloxyl units "D" chosen from the group formed by the siloxyl units $W_2SiO_{2/2}$, $WZSiO_{2/2}$ and $Z^1_2SiO_{2/2}$, and from siloxyl units "M" chosen from the group formed by the siloxyl units $W_3SiO_{1/2}$, $WZ_2SiO_{1/2}$, $W_2ZSiO_{1/2}$ and $Z^1_3SiO_{1/2}$. The symbols W, Z and $Z^1$ are as described above.

As examples of end units "M", mention may be made of trimethylsiloxy, dimethylvinylsiloxy or dimethylhexenylsiloxy groups.

As examples of units "D", mention may be made of dimethylsiloxy, methylvinylsiloxy, methylbutenylsiloxy, methylhexenylsiloxy, methyldecenylsiloxy or methyldecadienylsiloxy groups.

Said organopolysiloxanes A may be oils with a dynamic viscosity from about 1 to 10000000 mPa·s at 25° C., generally from about 200 to 1000000 mPa·s at 25° C.

All the viscosities under consideration in the present description correspond to a "Newtonian" dynamic viscosity magnitude at 25° C., i.e. the dynamic viscosity which is measured, in a manner that is known per se, with a Brookfield viscometer at a shear rate gradient that is low enough for the measured viscosity to be independent of the rate gradient.

When they are cyclic organopolysiloxanes, they are formed from siloxyl units "D" having the following formulae: $W_2SiO_{2/2}$, $Z^1_2SiO_{2/2}$ or $WZSiO_{2/2}$, which may be of the dialkylsiloxy, alkylvinylsiloxy or alkylsiloxy type. Examples of such siloxyl units have already been mentioned above. Said cyclic organopolysiloxanes A have a viscosity from about 1 to 5000 mPa·s at 25° C.

Organohydrogenpolysiloxane B

According to a preferred embodiment, the organohydrogenopolysiloxane compound B is an organopolysiloxane containing at least two hydrogen atoms per molecule, bonded to an identical or different silicon atom, and preferably containing at least three hydrogen atoms per molecule directly bonded to an identical or different silicon atom.

Advantageously, the organohydrogenopolysiloxane compound B is an organopolysiloxane comprising:
(i) at least two siloxyl units and preferably at least three siloxyl units having the following formula:

 (B.1)

in which:
d=1 or 2, e=0, 1 or 2 and d+e=1, 2 or 3,
the symbols $Z^3$, which may be identical or different, represent a monovalent linear, branched or cyclic alkyl group containing from 1 to 30 carbon atoms, preferably from 1 to 8 carbon atoms, that may be unsubstituted or substituted by one or more halogen atoms such as fluorine, chlorine and bromine atoms and/or by one or more aryl group such as phenyl, and even more preferentially chosen from the group formed by methyl, ethyl, propyl, 3,3,3-trifluoropropyl, and (ii) optionally at least one siloxyl unit having the following formula:

(B.2)

in which:
c=0, 1, 2 or 3,
the symbols $Z^2$, which may be identical or different, represent a monovalent linear, branched or cyclic alkyl group containing from 1 to 30 carbon atoms, preferably from 1 to 8 carbon atoms, that may be unsubstituted or substituted by one or more halogen atoms such as fluorine, chlorine and bromine atoms and/or by one or more aryl group such as phenyl, and even more preferentially chosen from the group formed by methyl, ethyl, propyl, 3,3,3-trifluoropropyl.

The organohydrogenopolysiloxane compound B may be formed solely from siloxyl units of formula (B.1) or may also comprise units of formula (B.2). It may have a linear, branched or cyclic structure.

Examples of siloxyl units of formula (B.1) are especially the following units: $H(CH_3)_2SiO_{1/2}$, and $HCH_3SiO_{2/2}$.

When they are linear polymers, they are essentially formed from:
siloxyl units "D" chosen from the units having the following formulae $Z^2_2SiO_{2/2}$ or $Z^3HSiO_{2/2}$, and
siloxyl units "M" chosen from the units having the following formulae $Z^3_3SiO_{1/2}$ or $Z^3_2HSiO_{1/2}$.

These linear organopolysiloxanes may be oils with a dynamic viscosity from about 1 to 1000000 mPa·s at 25° C., generally from about 10 to 500000 mPa·s at 25° C. or preferably from about 50 to 10000 or 5000 mPa·s at 25° C., or gums with a molecular mass of about 1000000 mPa·s or more at 25° C.

When they are cyclic organopolysiloxanes, they are formed from siloxyl units "D" having the following formulae $Z^{22}SiO_{2/2}$ and $Z^3HSiO_{2/2}$, which may be of the dialkylsiloxy type or units $Z^3HSiO_{2/2}$ solely. They then have a viscosity from about 1 to 5000 mPa·s.

Examples of linear organohydrogenopolysiloxane compounds B are: dimethylpolysiloxanes bearing hydrogenodimethylsilyl end groups, dimethylhydrogenomethylpolysiloxanes bearing trimethylsilyl end groups, dimethylhydrogenomethylpolysiloxanes bearing hydrogenodimethylsilyl end groups, hydrogenomethylpolysiloxanes bearing trimethylsilyl end groups, and cyclic hydrogenomethylpolysiloxanes.

The oligomers and polymers corresponding to the general formula (B.3) are especially preferred as organohydrogenopolysiloxane compound B:

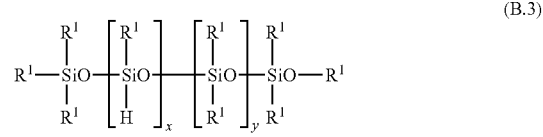
(B.3)

in which:
x and y are an integer ranging between 0 and 10000,
the symbols $R^1$, which may be identical or different, represent, independently of each other:
a linear or branched alkyl radical containing 1 to 8 carbon atoms, optionally substituted with at least one halogen, preferably fluorine, the alkyl radicals preferably being methyl, ethyl, propyl, octyl and 3,3,3-trifluoropropyl, or
a cycloalkyl radical containing between 5 and 8 cyclic carbon atoms.
an aralkyl radical bearing an alkyl part containing between 5 and 14 carbon atoms and an aryl part containing between 6 and 12 carbon atoms.

The following compounds are particularly suitable for the invention as organohydrogenopolysiloxane compound B:

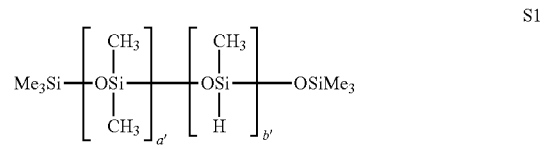
S1

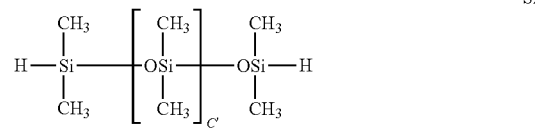
S2

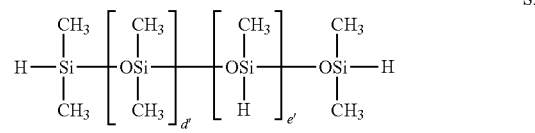
S3 with a', b', c', d' and e' defined below:
in the polymer of formula S1:
0≤a'≤150, preferably 0≤a'≤100, and more particularly 0≤a'≤20, and
1≤b'≤90, preferably 10≤b'≤80 and more particularly 30≤b'≤70,
in the polymer of formula S2: 0≤c'≤15
in the polymer of formula S3: 5≤d'≤200, preferably 20≤d'≤100, and 2≤e'≤90, preferably 10≤e'≤70.

Catalyst C

Catalyst C consisting of at least one metal, or compound, from the platinum group are well known. The metals of the platinum group are those known under the name platinoids, this term combining, besides platinum, ruthenium, rhodium, palladium, osmium and iridium. Platinum and rhodium compounds are preferably used. Complexes of platinum and of an organic product with 1,3-divinyltetramethyldisiloxane, a complex of silicone resin powder that contains aforementioned catalysts, a rhodium compound, such as those expressed by formulae: $RhCl(Ph_3P)_3$, $RhCl_3[S(C_4H_9)_2]_3$, etc.; tetrakis(triphenyl)palladium, a mixture of palladium black and triphenylphosphine, etc.

The platinum catalyst ought preferably to be used in a catalytically sufficient amount, to allow sufficiently rapid crosslinking at room temperature. Typically, 1 to 10000 ppm by weight of the catalyst are used, based in the amount of Pt metal, relative to the total silicone composition preferably 1 to 100 ppm by weight, more preferably 1 to 50 ppm by weight.

Reinforcing Silica Filler D

To allow a sufficiently high mechanical strength, it is advantageous to include in the addition-crosslinking silicone compositions the silica fine particles as reinforcing fillers D, which is at least partly surface treated. Precipitated and fumed silicas and mixtures thereof can be used. The specific surface area of these actively reinforcing fillers ought to be at least 50 m$^2$/g and preferably in the range from 100 to 400 m$^2$/g as determined by the BET method. Actively reinforcing fillers of this kind are very well-known materials within the field of the silicone rubbers. The stated silica fillers may have hydrophilic character or may have been hydrophobized by known processes. Advantageously, the silica reinforcing fillers is subjected to an overall surface treatment. That means at least 50%, more preferably at least 80% or at least 90% of or especially preferably the entirety of the surface of silica reinforcing fillers is preferably hydrophobic treated.

In a preferred embodiment, the silica reinforcing filler is fumed silica with a specific surface area of at least 50 m$^2$/g and preferably in the range from 100 to 400 m$^2$/g as determined by the BET method. Fumed silica that is subjected to hydrophobic surface treatment may be used. In those cases, where a fumed silica that has undergone hydrophobic surface treatment is used, either a fumed silica that has been subjected to preliminary hydrophobic surface treatment may be used, or a surface treatment agent may be added during mixing of the fumed silica with the organopolysiloxane A, so that the fumed silica is treated in-situ. The surface treatment agent may be selected from any of the conventionally used agents, such as alkylalkoxysilanes, alkylchlorosilanes, alkylsilazanes, silane coupling agents, titanate-based treatment agents, and fatty acid esters, and may use either a single treatment agent, or a combination of two or more treatment agents, which may be used either simultaneously or at different timings.

The amount of the silica reinforcing filler D in the addition-crosslinking silicone compositions is in the range from 2% to 40% by weight, preferably 5% to 35% by weight and more preferably 10% to 30% by weight of the total composition. If this blend quantity is less than 2% by weight, then adequate elastomer strength may not be obtainable and the collapse may not be noticeably reduced, whereas if the blend quantity exceeds 40% by weight, the actual blending process may become difficult. More preferred amount as given above will lead to more remarkable improvements in respect to the collapse, deformation and processability.

Organopolysiloxane Having an Aryl Group E

Organopolysiloxane having an aryl group E is an organopolysiloxane containing at least one siloxyl unit which carries an aryl group directly bonded to Si-atom.

In a preferred embodiment the organopolysiloxane having an aryl group E is an organopolysiloxane containing siloxyl units of the formula (E-1):

(E-1)

in which
R$^5$ and R$^6$ is independently from each other selected from hydrocarbon-based group containing from 1 to 30 carbon atoms and hydrogen;

where
n is an integer greater than or equal to 1;
p and q are independently 0, 1, 2 or 3; and
p+q=1, 2 or 3;
provided that the organopolysiloxane having an aryl group E contains at least one aryl group directly bonded to Si atom.

In one preferred embodiment, the organopolysiloxane E is consisting substantially of siloxyl units of the formula (E-1).

In a preferred embodiment, the hydrocarbon-based group contains from 1 to 24, preferably 1 to 18, more preferably 1 to 12, such as 2 to 8 carbon atoms. The hydrocarbon-based group may include linear, branched or cyclic alkyl or alkenyl groups that are unsubstituted or substituted by one or more halogens and an aryl group, and an aryl group that is unsubstituted or substituted by one or more halogens and C$_1$-C$_6$-alkyl groups and contains between 6 and 12 carbon atoms.

The organopolysiloxane E is of linear, branched or cyclic structure, and preferably linear. In the linear or branched structure, the organopolysiloxane E may be terminated by group —R or —SiR$_3$ wherein R, independently from each other, has the meaning given for groups R$^5$ and R$^6$. The skilled person will understand that the aryl group may be present pendent to the main chain of organopolysiloxane E or at the end of the chain as a terminated group R or contained in the terminated group —SiR$_3$.

In a preferred embodiment, the aryl groups may be unsubstituted or substituted by one or more halogens and C$_1$-C$_6$-alkyl groups and contain between 6 and 12 carbon atoms. More preferentially they are chosen from the group formed by xylyl, tolyl and phenyl radicals, most preferably phenyl radical.

In a preferred embodiment, in the formula (E-1) above:
n is an integer greater than or equal to 2.
In a preferred embodiment, in the formula (E-1) above:
p and q are independently from each other 1 or 2.
In a preferred embodiment, in the formula (E-1) above:
At least one of groups R$^5$ and R$^6$ is an aryl group and the others are chosen from the group formed by an alkyl group containing from 1 to 8 carbon atoms, preferably methyl or ethyl group, and an alkenyl radical containing from 2 to 6 carbon atoms, preferably vinyl group.
In a further preferred embodiment, the organopolysiloxane having an aryl group E, such as that of formula (E-1), contains at least one aryl group, preferably a phenyl group, and at least one alkenyl group preferably vinyl group.
In a further preferred embodiment, the organopolysiloxane having an aryl group E, such as that of formula (E-1), contains at least one aryl group, preferably a phenyl group, and at least one SiH group.
In another preferred embodiment, the organopolysiloxane having an aryl group E, such as that of formula (E-1), contains at least one aryl group, preferably a phenyl group, at least one alkenyl group preferably vinyl group and at least one SiH group.

In view of the improvement of rheological property and compatibility and especially in order further to avoid oil bleeding and improve the transparency which may be very important for the silicone elastomer product, it is advantageous for the organopolysiloxane E to contain, in addition to an aryl group, at least one alkenyl group preferably vinyl group or SiH group. Alternative, the organopolysiloxane E contains additionally both alkenyl group and Si—H group. The aryl and alkenyl groups and optionally hydrogen may be bonded directly to the same or different Si-atoms, i.e. located in the same or different siloxyl units. Preferably, the alkenyl group, more preferably vinyl group, is a terminated group of the organopolysiloxane chain.

In one advantageous embodiment, the organopolysiloxane having an aryl group E contains or consists of organopolysiloxane which is consisting of the above-mentioned siloxyl units of the formula (E-1) terminated by group —R or —SiR$_3$.

As useful examples of the organopolysiloxane having an aryl group E, the compounds of following formulae can be mentioned:

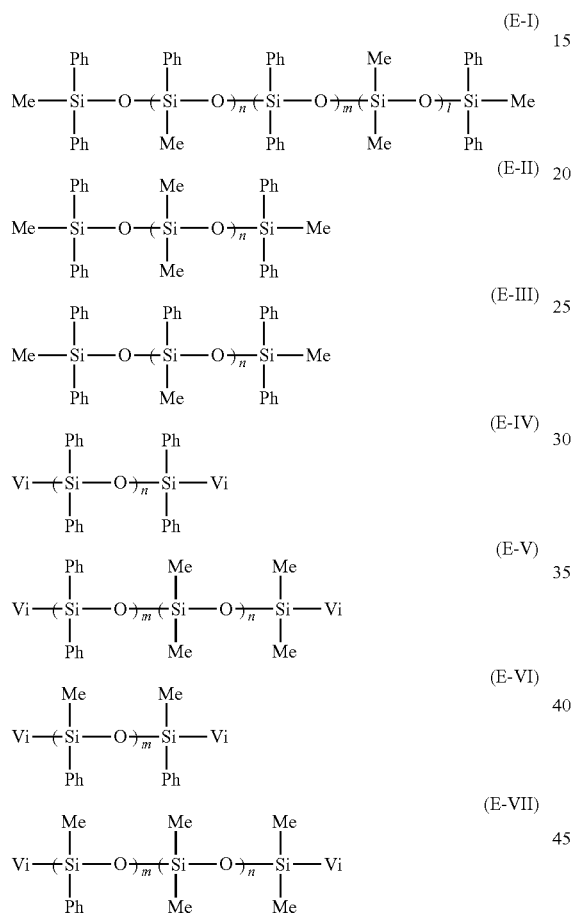

Methods of preparing the organopolysiloxane having an aryl group and preferably an alkenyl group are well known in the art, for example in CN105778102A, CN 108329475A, CN106977723A, CN105778102A, CN101885845A, CN104403105A and CN103012797A.

In the instant invention, the silicone composition comprises 0.3-30 wt %, preferably 0.8-20 wt %, more preferably 1.0-10.0 wt % and most preferably 1.0-7.0 wt % of at least one organopolysiloxane having an aryl group E with respect to the total weight of the silicone composition. In particular, in case of the amount below 7.0 wt % or even 6.5 wt % or 6.0 wt % of organopolysiloxane having an aryl group E, the transparency of the composition can be further kept in a desired level which may be especially helpful in some applications.

Furthermore, advantageously, the organopolysiloxane having an aryl group E has the viscosity ranging from 3~10 000 000 mPas, preferably ranging from 10~200 000 mPas, such as 50~100 000 mPas and 100~10 000 mPas. The organopolysiloxane having an aryl group E has refractive index above 1.405, preferably ranging from 1.41~1.6, more preferably from 1.43~1.58.

Accordingly, the amount of aryl group is from 2% to 70% by weight, preferably 5% to 62%, and for example 10% to 58%, based on the total weight of organopolysiloxane having an aryl group E.

Crosslinking Inhibitor F

Crosslinking inhibitors are an optional component. But they are commonly used in addition crosslinking silicone compositions to slow the curing of the composition at ambient temperature. The crosslinking inhibitor F may be chosen from the following compounds:
acetylenic alcohols such as ethynylcyclohexanol,
tetramethylvinyltetrasiloxane, such as 2,4,6,8-Tetramethyl-2,4,6,8-tetravinylcyclotetrasiloxane
pyridine,
organic phosphines and phosphites,
unsaturated amides, and
alkyl maleates.

These acetylenic alcohols (Cf. FR-B-1 528 464 and FR-A-2 372 874), which are among the preferred hydrosilylation-reaction thermal blockers, have the formula:

in which: R' is a linear or branched alkyl radical, or a phenyl radical; and —R" is H or a linear or branched alkyl radical, or a phenyl radical; the radicals R' and R" and the carbon atom a to the triple bond possibly forming a ring.

The total number of carbon atoms contained in R' and R" being at least 5 and preferably from 9 to 20. For the said acetylenic alcohols, examples that may be mentioned include:
1-ethynyl-1-cyclohexanol;
3-methyl-1-dodecyn-3-ol;
3,7,11-trimethyl-1-dodecyn-3-ol;
1,1-diphenyl-2-propyn-1-ol;
3-ethyl-6-ethyl-1-nonyn-3-ol;
2-methyl-3-butyn-2-ol;
3-methyl-1-pentadecyn-3-ol; and
diallyl maleate or diallyl maleate derivatives.

In a preferred embodiment, the crosslinking inhibitor is 1-ethynyl-1-cyclohexanol To obtain a longer working time or "pot life", the quantity of the inhibitor is adjusted to reach the desired "pot life". The concentration of the catalyst inhibitor in the present silicone composition is sufficient to slow curing of the composition at ambient temperature. This concentration will vary widely depending on the particular inhibitor used, the nature and concentration of the hydrosilylation catalyst, and the nature of the organohydrogenpolysiloxane. Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for an inhibitor in a given silicone composition can be readily determined by routine experimentation.

Advantageously, the amount of the crosslinking inhibitor F in the addition-crosslinking silicone compositions is in the range from 0.01% to 2% weight, preferably from 0.03% to 1% weight with respect to the total weight of the silicone composition.

The use of the inhibitor is effective to avoid the premature curing of the silicone composition on the tip of the nozzle and subsequent disfiguration of the printed layer.

Other Components G:

The silicone compositions according to the invention may also comprise other additives like a standard semi-reinforcing or packing filler, other functional silicone resins such as silicone resin with vinyl group, non-reactive methyl polysiloxane, pigments, or adhesion promoters.

Non siliceous minerals that may be included as semi-reinforcing or packing mineral fillers can be chosen from the group constituted of: carbon black, titanium dioxide, aluminium oxide, hydrated alumina, calcium carbonate, ground quartz, diatomaceous earth, zinc oxide, mica, talc, iron oxide, barium sulfate and slaked lime.

In the context of the invention, the mole ratio of the hydrogen atoms bonded to silicon (Si—H) to the alkenyl radicals bonded to silicon (e.g. Si—CH=CH$_2$) in the entire composition is between 0.2 and 20, preferably between 0.5 and 15, more preferentially between 0.5 and 10 and even more preferentially between 0.5 and 5. The Si—H and alkenyl groups in the entire composition refer to those comprised in the components A, B and E.

In an exemplary embodiment, the mass content of alkenyl units in the entire composition, preferably vinyl units, is between 0.001 and 30%, preferably between 0.01 and 10%.

In another exemplary embodiment, the mass content of SiH units in the entire composition is between 0.2 and 91%, preferably between 0.5 and 80% and more preferably between 1.0 and 50%.

In a preferable embodiment, the silicone composition of the invention comprise, per 100% weight of the silicone composition:
- from 10 to 95% weight of at least one organopolysiloxane compound A;
- from 0.1 to 40% weight of at least one organohydrogenopolysiloxane compound B;
- from 5 to 35% weight of at least one reinforcing silica filler D which is at least partly surface treated;
- from 0.8 to 20% weight of at least one organopolysiloxane having an aryl group E;
- from 0.002% to 0.01% weight of catalyst e.g. platinum; and
- from 0.01 to 2% weight of at least one crosslinking inhibitor F.

In another preferable embodiment, the silicone composition of the invention comprise, per 100% weight of the silicone composition:
- from 20 to 85% weight of at least one organopolysiloxane compound A;
- from 0.1 to 15% weight of at least one organohydrogenopolysiloxane compound B;
- from 10 to 30% weight of at least one reinforcing silica filler D which is at least partly surface treated
- from 1.0 to 15% weight of at least one organopolysiloxane having an aryl group E;
- from 0.0002% to 0.01% weight of catalyst e.g. platinum; and
- from 0.01 to 1% weight of at least one crosslinking inhibitor F.

It should be noted that individual amounts illustrated in the above two preferable embodiments and also in the scopes above-mentioned in the instant application are just exemplary and thus each of them can be arbitrarily combined in any way as is well understood for the skilled person in the art.

Composition Properties

In this method, the silicone compositions crosslinkable through addition reactions show the adequate rheological properties necessary to avoid collapse or deformation of the objects at room temperature before complete curing.

Preferably, the silicone compositions with a thixotropic index of higher than 2 for example higher than 3, or higher than 4 depending on different formulations are used to manufacture an article by additive manufacturing.

In a preferred embodiment, the silicone compositions crosslinkable through addition reactions have a dynamic viscosity of 800-5 000 000 mPas, preferably 2000~10 000 000 mPa·s, more preferably 5000~1 000 000 mPa·s.

The crosslinking of the silicone composition starts, even if slowly, as soon as the layer is printed. To avoid collapse or deformation of the objects at room temperature before complete curing, rheological properties must be managed so that the thixotropic index falls within the above stated scope.

Multi-Part Composition

The composition can be a one-part composition comprising components A to E in a single part or, alternatively, a multi-part composition comprising these components in two or more parts, provided components B, and C are not present in the same part. For example, a multi-part composition can comprise a first part containing a portion of component A and all of component C, and a second part containing the remaining portion of component A and all of component B. In certain embodiments, component A is in a first part, component B is in a second part separate from the first part, and component C is in the first part, in the second part, and/or in a third part separate from the first and second parts. Components D, E and F may be present in a respective part (or parts) along with at least one of components B, or C, and/or can be in a separate part (or parts).

The one-part composition is typically prepared by combining the principal components and any optional ingredients in the stated proportions at ambient temperature. Although the order of addition of the various components is not critical if the composition is to be used immediately, the hydrosilylation catalyst is typically added last at a temperature below about 30° C. to prevent premature curing of the composition.

Also, the multi-part composition can be prepared by combining the components in each part. Combining can be accomplished by any of the techniques understood in the art such as, blending or stirring, either in a batch or continuous process in a particular device. The particular device is determined by the viscosity of the components and the viscosity of the final composition.

In certain embodiments, when the silicone compositions are multipart silicone compositions, the separate parts of the multi-part silicone composition may be mixed in a dispense printing nozzle, e.g. a dual dispense printing nozzle, prior to and/or during printing. Alternatively, the separate parts may be combined immediately prior to printing.

Another aspect of the present invention is a silicone elastomer article produced by the method described according to the present invention.

Another aspect of the present in invention is the use of silicone compositions as described above with a 3D printer, preferably selected from an extrusion 3D printer or a material jetting 3D printer.

Another aspect of the present in invention is the use of silicone compositions crosslinkable through addition reactions as described above with a 3D printer, preferably selected from an extrusion 3D printer or a material jetting 3D printer, to manufacture a silicone elastomer article.

The following examples are intended to illustrate and not to limit the invention.

EXAMPLES

Addition-crosslinking silicone compositions are prepared and printed using an extrusion 3D printer according with disclosure.

Raw Materials

TABLE 1

| Raw materials | Chemical description or structure |
|---|---|
| A-1 | Vinyl terminated Polydimethylsiloxane, viscosity: 1500 mPa•s, vinyl content: 0.26 wt % |
| A-2 | Vinyl terminated Polydimethylsiloxane, viscosity: 600 mPa•s, vinyl content: 0.38 wt % |
| B-1 | Poly(methylhydrogeno)(dimethyl)siloxane with SiH groups in-chain and end-chain (α/ω), viscosity: 300 mPa•s, SiH content: 4.75 wt % |
| B-2 | Poly(methylhydrogeno)(dimethyl)siloxane with SiH groups in-chain and end-chain (α/ω), viscosity: 25 mPa•s, SiH content: 20 wt % |
| B-3 | Poly(methylhydrogeno) (dimethyl)siloxane with end-chain (α/ω) SiH groups, viscosity: 8.5 mPa•s, SiH content: 5.5 wt % |
| C-1 | Pt catalyst: Platinum(0)-1,3-divinyl-1,1,3,3-tetramethyldisiloxane (Pt content: 10 wt %) |
| D-1 | Treated silica, CAS NO: 68988-89-6 |
| E-1 | Methyl phenyl polysiloxane, viscosity: 75 mPa•s, refractive index: 1.4912 |
| | $\text{Me}-\underset{\underset{\text{Ph}}{\mid}}{\overset{\overset{\text{Ph}}{\mid}}{\text{Si}}}-\text{O}-(\underset{\underset{\text{Me}}{\mid}}{\overset{\overset{\text{Ph}}{\mid}}{\text{Si}}}-\text{O})_n(\underset{\underset{\text{Ph}}{\mid}}{\overset{\overset{\text{Ph}}{\mid}}{\text{Si}}}-\text{O})_m(\underset{\underset{\text{Me}}{\mid}}{\overset{\overset{\text{Me}}{\mid}}{\text{Si}}}-\text{O})_l\underset{\underset{\text{Ph}}{\mid}}{\overset{\overset{\text{Ph}}{\mid}}{\text{Si}}}-\text{Me}$ |
| E-2 | Methyl phenyl polysiloxane, viscosity: 40 mPa•s, refractive index: 1.492 |
| | $\text{Me}-\underset{\underset{\text{Ph}}{\mid}}{\overset{\overset{\text{Ph}}{\mid}}{\text{Si}}}-\text{O}-(\underset{\underset{\text{Me}}{\mid}}{\overset{\overset{\text{Ph}}{\mid}}{\text{Si}}}-\text{O})_n(\underset{\underset{\text{Ph}}{\mid}}{\overset{\overset{\text{Ph}}{\mid}}{\text{Si}}}-\text{O})_m(\underset{\underset{\text{Me}}{\mid}}{\overset{\overset{\text{Me}}{\mid}}{\text{Si}}}-\text{O})_l\underset{\underset{\text{Ph}}{\mid}}{\overset{\overset{\text{Ph}}{\mid}}{\text{Si}}}-\text{Me}$ |
| E-3 | Methyl phenyl polysiloxane, viscosity: 1360 mPa•s, refractive index: 1.534 |
| | $\text{Me}-\underset{\underset{\text{Ph}}{\mid}}{\overset{\overset{\text{Ph}}{\mid}}{\text{Si}}}-\text{O}-(\underset{\underset{\text{Me}}{\mid}}{\overset{\overset{\text{Ph}}{\mid}}{\text{Si}}}-\text{O})_n(\underset{\underset{\text{Ph}}{\mid}}{\overset{\overset{\text{Ph}}{\mid}}{\text{Si}}}-\text{O})_m(\underset{\underset{\text{Me}}{\mid}}{\overset{\overset{\text{Me}}{\mid}}{\text{Si}}}-\text{O})_l\underset{\underset{\text{Ph}}{\mid}}{\overset{\overset{\text{Ph}}{\mid}}{\text{Si}}}-\text{Me}$ |
| E-4 | Methyl phenyl polysiloxane, viscosity: 10000 mPa•s, refractive index: 1.543 |
| E-5 | Methyl phenyl polysiloxane, viscosity: 40 mPa•s, refractive index: 1.473 |
| | 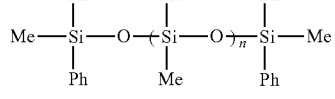 <br> n ≥ 5 |
| E-6 | Methyl phenyl polysiloxane, viscosity: 90 mPa•s, refractive index: 1.553 |
| | 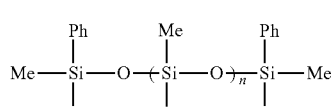 |
| E-7 | Methyl phenyl polysiloxane, viscosity: 413 mPa•s, refractive index: 1.578 |
| | 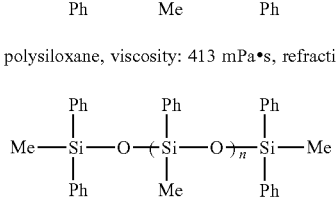 |

TABLE 1-continued

| Raw materials | Chemical description or structure |
|---|---|
| E-8 | Vinyl phenyl polysiloxane viscosity: 200 mPa·s, refractive index: 1.551, phenyl content: 56 wt % |
| E-9 | Methyl vinyl phenyl polysiloxane viscosity: 60 mPa·s, refractive index: 1.474, phenyl content: 27.1 wt % |
| E-10 | Methyl vinyl phenyl polysiloxane viscosity: 1900 mPa·s, refractive index: 1.532 |
| E-11 | Vinyl phenyl polysiloxane viscosity: 5 mPa·s, refractive index: 1.502, phenyl content: 40.1 wt %<br><br>m = 1 or 2 |
| E-12 | Methyl vinyl phenyl polysiloxane viscosity: 3000 mPa·s, refractive index: 1.443, phenyl content: 20% |
| E-13 | Methyl vinyl phenyl polysiloxane viscosity: 800 mPa·s, refractive index: 1.46, phenyl content: 15% |
| E-14 | Methyl vinyl phenyl polysiloxane viscosity: 3000 mPa·s, refractive index: 1.46, phenyl content: 15% |
| F-1 | 2,4,6,8-Tetramethyl-2,4,6,8-tetravinylcyclotetrasiloxane, CAS NO.: 2554-06-5 |

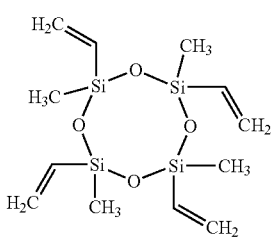 [SMILES: C=C[Si]1(C)O[Si](C)(C=C)O[Si](C)(C=C)O[Si](C)(C=C)O1]

TABLE 1-continued

| Raw materials | Chemical description or structure |
|---|---|
| F-2 | Ethynylcyclohexanol, CAS NO.: 78-27-3  |
| 其他组分 G-1 | Non-reactive methyl polysiloxane, viscosity: 50 mPa•s |

LSR Base Composition

Example 1-34

In example 1, all of the raw materials is mixed according to weight ratio. 53.97 parts of vinyl terminated polydimethylsiloxane A-1 and 16.67 parts of A-2 are mixed with 23.07 part of D-1. 0.38 part of F-1 is added and then mixed sufficiently. 2.27 parts of an organohydrogenopolysiloxane B-1, 1.81 parts of an organohydrogenopolysiloxane B-2 and 1.81 parts of an organohydrogenopolysiloxane B-3 are added and stirred, following with 0.017 part of C-1 to obtain Example 1. Example 10 and 21 are prepared likewise according to the above process with varying ratios of raw materials as shown in tables 2-1 and 2-2. No organopolysiloxane having an aryl group is contained in Examples 1, 10 and 21.

In example 2, all of the raw materials are mixed according to weight ratio shown in table 2-1. 53.97 parts of A-1 and 16.67 parts of A-2 are mixed with 23.07 parts of D-1. 0.38 part of F-1 is added and then mixed sufficiently. 2.27 parts of an organohydrogenopolysiloxane B-1, 1.81 parts of an organohydrogenopolysiloxane B-2 and 1.81 parts of an organohydrogenopolysiloxane B-3 are added and stirred, following with 0.017 part of C-1 and 1 part of E-1 to obtain example 2. Example 3-9, example 11-20, example 22-35 are also prepared likewise according to the above process with varying ratios of raw materials as shown in table 2-1 and 2-2.

3D Printing Process Based on Curable Method

The 3D printing process was carried out by using ULTIMAKER 2+ equipment. The Mixture of example 35 was used as printing materials. Printing process is as follows: I. Loading silicone materials in extruder;
II. Level adjustment of printing platform and printing parameter setting;
III. Strat printing via extruder layer by layer.
Wherein, parameters of printing is below:
Diameter of nozzle: 0.84 mm
The distance between nozzle and platform: 0.5 mm.
The printing process and sample were observed, finding that each layer formed smoothly and shape printed was kept very stable.

Properties Assessment

According to the invention, assessment results of the prepared samples are listed in the table 2-1 and table 2-2.

Viscosity: according to ASTM D445, the viscosity of the sample mixture is tested at 25° C., the detail of testing conditions can be seen in the table 2-1 and 2-2, in which, for example, the expression Viscosity-20 (7#, 20 rpm) means that the viscosity is measured at 20 rpm by using spindle 7, and likewise Viscosity-2 (7#, 2 rpm) means the viscosity measured at 2 rpm by using spindle 7.

Thixotropic Index: A fluid is thixotropic to have a low viscosity when stirred at high speed and high viscosity at low speed. The thixotropic index is obtained by measuring the viscosity at two speeds that differ by a factor of 10 (for example 2 and 20 rpm) at room temperature. Herein, the ratio between Viscosity-2 and Visocisty-20, i.e. (Viscosity-2/Visocisty-20), defines how well the fluid will hang or resist sagging under gravity. At rest, the fluid will not flow, but when subjected to shear or pressure, it flows easily. The higher thixotropic ratio, the stronger thixotropy of the non-Newtonian fluid is.

Hardness: according to ASTM D2240, the hardness of cured samples are tested at 25° C., the details of testing conditions can be seen in the table 2-1 and 2-2. The cured sample was obtained under 150° C. for 30 min.

Tensile strength and Elongation at break: according to ASTM D412, tensile strength and elongation at break of cured samples are tested at 25° C., the details of testing conditions can be seen in the table 2-1 and 2-2. The cured sample was obtained under 150° C. for 30 min.

Tear strength: according to ASTM D642, tear strength of cured samples are tested at 25° C., the details of testing conditions can be seen in the table 2. The cured sample was obtained under 150° C. for 30 min.

Transparency assessment: observation method is employed to assess transparency of the samples. In the table 2-1 and 2-2, more marks "+" indicates higher transparency. Different transparency of the samples can be seen in FIG. 1.

Oil bleeding assessment: The samples are placed on the white paper and stay at room temperature for one week. Oil spots can be seen if the sample exhibits oil bleeding phenomenon. More marks "+" indicates the more oil bleeding on the surface of samples. Accordingly, the mark "NO" means no oil bleeding spots are observed.

TABLE 2-1

| Formulas and test results of curable silicone compositions | | | | | | | | | | |
|---|---|---|---|---|---|---|---|---|---|---|
| Raw material | Ex. 1 | Ex. 2 | Ex. 3 | Ex. 4 | Ex. 5 | Ex. 6 | Ex. 7 | Ex. 8 | Ex. 9 | Ex. 10 |
| A-1 | 53.97 | 53.97 | 53.97 | 53.97 | 53.97 | 53.97 | 53.97 | 53.97 | 53.97 | 57.28 |
| A-2 | 16.67 | 16.67 | 16.67 | 16.67 | 16.67 | 16.67 | 16.67 | 16.67 | 16.67 | 7.05 |
| B-1 | 2.27 | 2.27 | 2.27 | 2.27 | 2.27 | 2.27 | 2.27 | 2.27 | 2.27 | 2.16 |
| B-2 | 1.81 | 1.81 | 1.81 | 1.81 | 1.81 | 1.81 | 1.81 | 1.81 | 1.81 | 1.72 |
| B-3 | 1.81 | 1.81 | 1.81 | 1.81 | 1.81 | 1.81 | 1.81 | 1.81 | 1.81 | 1.72 |
| C-1 | 0.017 | 0.017 | 0.017 | 0.017 | 0.017 | 0.017 | 0.017 | 0.017 | 0.017 | 0.017 |

TABLE 2-1-continued

Formulas and test results of curable silicone compositions

| Raw Material | | | | | | | | | | |
|---|---|---|---|---|---|---|---|---|---|---|
| D-1 | 23.07 | 23.07 | 23.07 | 23.07 | 23.07 | 23.07 | 23.07 | 23.07 | 23.07 | 24.59 |
| E-1 | 0 | 1 | 2 | 0 | 0 | 0 | 0 | 0 | 0 | 0 |
| E-2 | 0 | 0 | 0 | 1 | 2 | 0 | 0 | 0 | 0 | 0 |
| E-3 | 0 | 0 | 0 | 0 | 0 | 1 | 2 | 0 | 0 | 0 |
| E-4 | 0 | 0 | 0 | 0 | 0 | 0 | 0 | 1 | 2 | 0 |
| E-5 | 0 | 0 | 0 | 0 | 0 | 0 | 0 | 0 | 0 | 0 |
| E-6 | 0 | 0 | 0 | 0 | 0 | 0 | 0 | 0 | 0 | 0 |
| E-7 | 0 | 0 | 0 | 0 | 0 | 0 | 0 | 0 | 0 | 0 |
| F-1 | 0.38 | 0.38 | 0.38 | 0.38 | 0.38 | 0.38 | 0.38 | 0.38 | 0.38 | 0.36 |
| F-2 | 0 | 0 | 0 | 0 | 0 | 0 | 0 | 0 | 0 | 0.095 |
| G-1 | 0 | 0 | 0 | 0 | 0 | 0 | 0 | 0 | 0 | 4.9 |
| Total | 100 | 101 | 102 | 101 | 102 | 101 | 102 | 101 | 102 | 100 |
| SiH/Si-alkenyl (mole ratio) | 1.38 | 1.38 | 1.38 | 1.38 | 1.38 | 1.38 | 1.38 | 1.38 | 1.38 | 1.42 |
| Test results | | | | | | | | | | |
| Viscosity-2, mPa·s, (7#, 2 rpm, 25° C.) | 243000 | 358000 | 514000 | 440000 | 700000 | 506000 | 680000 | 300000 | 360000 | 397000 |
| Viscosity-20, mPa·s, (7#, 20 rpm, 25° C.) | 88600 | 118000 | 164000 | 129000 | 200000 | 142000 | 199000 | 109000 | 132000 | 105000 |
| Thixotropic Index | 2.74 | 3.03 | 3.13 | 3.41 | 3.5 | 3.56 | 3.42 | 2.75 | 2.73 | 3.78 |
| Hardness/Shore. A | NA | NA | NA | NA | NA | NA | NA | NA | NA | NA |
| Tear strength/N/mm | NA | NA | NA | NA | NA | NA | NA | NA | NA | NA |
| Tensile strength/MPa | NA | NA | NA | NA | NA | NA | NA | NA | NA | NA |
| Elongation at break/% | NA | NA | NA | NA | NA | NA | NA | NA | NA | NA |
| Transparency | NA | NA | NA | NA | NA | NA | NA | NA | NA | NA |
| Oil bleeding | NA | NA | NA | NA | NA | NA | NA | NA | NA | NA |

| Raw Material | Ex. 11 | Ex. 12 | Ex. 13 | Ex. 14 | Ex. 15 | Ex. 16 | Ex. 17 | Ex. 18 | Ex. 19 | Ex. 20 |
|---|---|---|---|---|---|---|---|---|---|---|
| A-1 | 57.28 | 57.28 | 57.28 | 57.28 | 57.28 | 57.28 | 57.28 | 57.28 | 57.28 | 57.28 |
| A-2 | 7.05 | 7.05 | 7.05 | 7.05 | 7.05 | 7.05 | 7.05 | 7.05 | 7.05 | 7.05 |
| B-1 | 2.16 | 2.16 | 2.16 | 2.16 | 2.16 | 2.16 | 2.16 | 2.16 | 2.16 | 2.16 |
| B-2 | 1.72 | 1.72 | 1.72 | 1.72 | 1.72 | 1.72 | 1.72 | 1.72 | 1.72 | 1.72 |
| B-3 | 1.72 | 1.72 | 1.72 | 1.72 | 1.72 | 1.72 | 1.72 | 1.72 | 1.72 | 1.72 |
| C-1 | 0.017 | 0.017 | 0.017 | 0.017 | 0.017 | 0.017 | 0.017 | 0.017 | 0.017 | 0.017 |
| D-1 | 24.59 | 24.59 | 24.59 | 24.59 | 24.59 | 24.59 | 24.59 | 24.59 | 24.59 | 24.59 |
| E-1 | 2 | 0 | 0 | 0 | 0 | 0 | 0 | 0 | 0 | 0 |
| E-2 | 0 | 1 | 2 | 0 | 0 | 0 | 0 | 0 | 0 | 0 |
| E-3 | 0 | 0 | 0 | 1 | 2 | 0 | 0 | 0 | 0 | 0 |
| E-4 | 0 | 0 | 0 | 0 | 0 | 1 | 2 | 0 | 0 | 0 |
| E-5 | 0 | 0 | 0 | 0 | 0 | 0 | 0 | 2 | 0 | 0 |
| E-6 | 0 | 0 | 0 | 0 | 0 | 0 | 0 | 0 | 2 | 0 |
| E-7 | 0 | 0 | 0 | 0 | 0 | 0 | 0 | 0 | 0 | 2 |
| F-1 | 0.36 | 0.36 | 0.36 | 0.36 | 0.36 | 0.36 | 0.36 | 0.36 | 0.36 | 0.36 |
| F-2 | 0.095 | 0.095 | 0.095 | 0.095 | 0.095 | 0.095 | 0.095 | 0.095 | 0.095 | 0.095 |
| G-1 | 4.9 | 4.9 | 4.9 | 4.9 | 4.9 | 4.9 | 4.9 | 4.9 | 4.9 | 4.9 |
| Total | 102 | 101 | 102 | 101 | 102 | 101 | 102 | 102 | 102 | 102 |
| SiH/Si-alkenyl (mole ratio) | 1.42 | 1.42 | 1.42 | 1.42 | 1.42 | 1.42 | 1.42 | 1.42 | 1.42 | 1.42 |
| Test results | | | | | | | | | | |
| Viscosity-2, mPa·s, (7#, 2 rpm, 25° C.) | 560000 | 520000 | 632000 | 564000 | 648000 | 436000 | 454000 | 486000 | 400000 | 498000 |
| Viscosity-20, mPa·s, (7#, 20 rpm, 25° C.) | 122600 | 114000 | 120000 | 123000 | 127000 | 107000 | 102000 | 110000 | 80000 | 103800 |
| Thixotropic Index | 4.57 | 4.56 | 5.27 | 4.59 | 5.1 | 4.07 | 4.45 | 4.42 | 5 | 4.8 |

TABLE 2-1-continued

Formulas and test results of curable silicone compositions

| | | | | | | | | | | |
|---|---|---|---|---|---|---|---|---|---|---|
| Hardness/Shore. A | 40 | NA | 51 | NA | 50 | NA | 52 | 39 | 43 | 36 |
| Tear strength/N/mm | 32 | NA | 32.3 | NA | 33 | NA | 24.3 | 30 | 29 | 28.8 |
| Tensile strength/MPa | 5.36 | NA | 7.1 | NA | 5.79 | NA | 6.77 | 5.5 | 5 | 4.62 |
| Elongation at break/% | 347 | NA | 250 | NA | 259 | NA | 273 | 346 | 312 | 304 |
| Transparency | ++++ | NA | NA | NA | + | NA | ++ | +++++ | +++++ | ++++ |
| Oil bleeding | NO | NA | + | NA | +++ | NA | NO | NO | NO | NO |

* NA means not applicable or not determined.

TABLE 2-2

| Raw materials | Example 21 | Example 22 | Example 23 | Example 24 | Example 25 |
|---|---|---|---|---|---|
| A-1 | 56.71 | 56.71 | 56.71 | 56.71 | 56.71 |
| A-2 | 6.97 | 6.97 | 6.97 | 6.97 | 6.97 |
| B-1 | 2.13 | 2.13 | 2.13 | 2.13 | 2.13 |
| B-2 | 1.7 | 1.7 | 1.7 | 1.7 | 1.7 |
| B-3 | 1.7 | 1.7 | 1.7 | 1.7 | 1.7 |
| C-1 | 0.016 | 0.016 | 0.016 | 0.016 | 0.016 |
| D-1 | 24.31 | 24.31 | 24.31 | 24.31 | 24.31 |
| E-3 | 0 | 0.5 | 5 | 8 | 10 |
| F-1 | 0.36 | 0.36 | 0.36 | 0.36 | 0.36 |
| F-2 | 0 | 0 | 0 | 0 | 0 |
| G-1 | 6.1 | 6.1 | 6.1 | 6.1 | 6.1 |
| Total | 100 | 100.5 | 105 | 108 | 110 |
| Test results | | | | | |
| Viscosity-2, mPa·s, (7#, 2 rpm, 25° C.) | 362000 | 524000 | 900000 | 1056000 | 1132000 |
| Viscosity-20, mPa·s, (7#, 20 rpm, 25° C.) | 83600 | 108000 | 158000 | 165000 | 173000 |
| Thixotropic Index | 4.33 | 4.85 | 5.7 | 6.4 | 6.54 |

| Raw materials | Example 26 | Example 27 | Example 28 | Example 29 | Example 30 |
|---|---|---|---|---|---|
| A-1 | 57.28 | 57.28 | 57.28 | 57.28 | 57.28 |
| A-2 | 7.05 | 7.05 | 7.05 | 7.05 | 7.05 |
| B-1 | 2.16 | 2.16 | 2.16 | 2.16 | 2.16 |
| B-2 | 1.72 | 1.72 | 1.72 | 1.72 | 1.72 |
| B-3 | 1.72 | 1.72 | 1.72 | 1.72 | 1.72 |
| C-1 | 0.017 | 0.017 | 0.017 | 0.017 | 0.017 |
| D-1 | 24.59 | 24.59 | 24.59 | 24.59 | 24.59 |
| E-8 | 2 | 0 | 0 | 0 | 0 |
| E-9 | 0 | 2 | 4.8 | 7.2 | 0 |
| E-10 | 0 | 0 | 0 | 0 | 2 |
| E-11 | 0 | 0 | 0 | 0 | 0 |
| E-12 | 0 | 0 | 0 | 0 | 0 |
| E-13 | 0 | 0 | 0 | 0 | 0 |
| E-14 | 0 | 0 | 0 | 0 | 0 |
| F-1 | 0.36 | 0.36 | 0.36 | 0.36 | 0.36 |
| F-2 | 0.095 | 0.095 | 0.095 | 0.095 | 0.095 |
| G-1 | 4.9 | 4.9 | 4.9 | 4.9 | 4.9 |
| Total | 102 | 102 | 104.8 | 107.2 | 102 |
| Test results | | | | | |
| Viscosity-2, mPa·s, (7#, 2 rpm, 25° C.) | 472000 | 586000 | 538000 | 526000 | 545000 |
| Viscosity-20, mPa·s, (7#, 20 rpm, 25° C.) | 114600 | 138400 | 127000 | 121000 | 122200 |
| Thixotropic Index | 4.12 | 4.23 | 4.24 | 4.34 | 4.46 |
| Hardness/ Shore. A | 39 | 40 | NA | NA | 43 |
| Tear strength/ N/mm | 15 | 34 | NA | NA | 33 |
| Tensile strength/ MPa | 4 | 6 | NA | NA | 5 |
| Elongation at break/% | 284 | 399 | NA | NA | 302 |
| Transparency | +++++ | +++++ | ++++ | + | + |
| Oil bleeding | NO | NO | NO | NO | NO |

TABLE 2-2-continued

| Raw materials | Example 31 | Example 32 | Example 33 | Example 34 | Example 35 |
|---|---|---|---|---|---|
| A-1 | 57.28 | 57.28 | 57.28 | 57.28 | 47 |
| A-2 | 7.05 | 7.05 | 7.05 | 7.05 | 5.78 |
| B-1 | 2.16 | 2.16 | 2.16 | 2.16 | 1.77 |
| B-2 | 1.72 | 1.72 | 1.72 | 1.72 | 1.41 |
| B-3 | 1.72 | 1.72 | 1.72 | 1.72 | 1.41 |
| C-1 | 0.017 | 0.017 | 0.017 | 0.017 | 0.0139 |
| D-1 | 24.59 | 24.59 | 24.59 | 24.59 | 20.17 |
| E-8 | 0 | 0 | 0 | 0 | 0 |
| E-9 | 0 | 0 | 0 | 0 | 0 |
| E-10 | 0 | 0 | 0 | 0 | 0 |
| E-11 | 2 | 0 | 0 | 0 | 0 |
| E-12 | 0 | 2 | 0 | 0 | 1.64 |
| E-13 | 0 | 0 | 2 | 0 | 0 |
| E-14 | 0 | 0 | 0 | 2 | 0 |
| F-1 | 0.36 | 0.36 | 0.36 | 0.36 | 0.3 |
| F-2 | 0.095 | 0.095 | 0.095 | 0.095 | 0.078 |
| G-1 | 4.9 | 4.9 | 4.9 | 4.9 | 20.43 |
| Total | 102 | 102 | 102 | 102 | 100 |
| Test results | | | | | |
| Viscosity-2, mPa · s, (7#, 2 rpm, 25° C.) | 472000 | 700000 | 790000 | 648000 | 276000 |
| Viscosity-20, mPa · s, (7#, 20 rpm, 25° C.) | 110600 | 156000 | 161400 | 150000 | 57800 |
| Thixotropic Index | 4.27 | 4.49 | 4.89 | 4.32 | 4.77 |
| Hardness/ Shore. A | 28 | 41 | 42 | 43 | NA |
| Tear strength/ N/mm | 1.8 | 31 | 31 | 34 | NA |
| Tensile strength/ MPa | 0.8 | 4.9 | 5.7 | 5.2 | NA |
| Elongation at break/% | 61.7 | 333 | 365 | 331 | NA |
| Transparency | +++++ | ++++ | +++ | +++ | NA |
| Oil bleeding | NO | NO | NO | NO | NA |

Different aryl-containing organopolysiloxanes (alkyl phenyl polysiloxanes here) are used to improve thixotropic properties of the silicone composition. As can be seen from the above tables, the structure of the organopolysiloxane having an aryl group, viscosity and refractive index have influences on thixotropic properties. As for a certain formulation of the silicone composition, with the increasing amount of alkyl phenyl polysiloxanes, thixotropic properties normally become better. But, unduly high amount of alkyl phenyl polysiloxane in some cases has risk of oil bleeding for the cured products. The preferred alkyl phenyl polysiloxane has additionally vinyl and/or SiH group which can involve polyaddition reaction to avoid oil bleeding but keep better thixotropic properties for 3D printing.

Different alkyl phenyl polysiloxanes are used to improve thixotropy of the silicone composition. The viscosity ratio at different speed of rotation is employed to assess thixotropy, which is derived from change of shear force accompanied with viscosity change of thixotropic liquid. The higher thixotropic index means better thixotropy. According to table 2-1, compared with example 1, examples 6 and 7 exhibit better thixotropy because of the addition of methyl phenyl polysiloxane E-3. The same results can be obtained in the examples 12 to 17, when compared with example 10. Meanwhile, the different contents of methyl phenyl polysiloxane E-3 are added in the examples 22-25, indicating that the thixotropy becomes better with increasing E-3 content.

In some cases, methyl phenyl polysiloxane may have a negative effect such as oil bleeding problem like examples 15 as may be adverse to some specific applications. With polysiloxane with both phenyl and vinyl group (example 26-35), however, a good thixotropic property without oil bleeding problem is obtained. Besides, by using polysiloxane with both phenyl and vinyl group, transparent product can be obtained in example 26, 27 and 31.

The invention claimed is:

1. A silicone composition for additive manufacturing a silicone elastomer article, wherein said silicone composition is crosslinkable through one or more addition reactions and comprises:
   (A) at least one organopolysiloxane compound A comprising, per molecule, at least two siloxyl units, wherein the siloxyl units comprise at least two $C_2$-$C_6$ alkenyl radicals bonded to silicon atoms, wherein
      (i) the at least two siloxyl units (A.1) independently having the following formula:

$$W_a Z_b SiO_{\frac{4-(a+b)}{2}} \quad (A.1)$$

in which:
      a=1 or 2, b=0, 1 or 2 and a+b=1, 2 or 3;
      each W is independently a linear or branched $C_2$-$C_6$ alkenyl group,
      and each Z is independently a $C_1$-$C_{30}$ monovalent linear, branched, or cyclic alkyl group,
         wherein the alkyl group is optionally substituted by at least one substituent selected from halogen or aryl group,
      (ii) and optionally at least one siloxyl unit having the following formula:

$$Z^1_c SiO_{\frac{4-c}{2}} \quad (A.2)$$

in which:
      C=0, 1, 2 or 3,
      each $Z^1$ is independently a $C_1$-$C_{30}$ monovalent linear, branched, or cyclic alkyl group, wherein the alkyl group is optionally substituted by at least one substituent selected from halogen or aryl group,
(B) at least one organohydrogenopolysiloxane compound B comprising:
(i) at least two siloxyl units having the following formula:

$$H_d Z^3_e SiO_{\frac{4-(d+e)}{2}} \quad (B.1)$$

in which:
d=1 or 2, e=0, 1 or 2 and d+e=1, 2 or 3,
each $Z^3$ is independently a $C_1$-$C_{30}$ monovalent linear, branched, or cyclic alkyl group,
wherein the alkyl group is optionally substituted by at least one substituent selected from halogen or aryl group, and
(ii) optionally-at least one siloxyl unit having the following formula:

$$Z^2_c SiO_{\frac{4-c}{2}} \quad (B.2)$$

in which:
c=0, 1, 2 or 3,
each $Z^2$ is independently a $C_1$-$C_{30}$ monovalent linear, branched, or cyclic alkyl group,
wherein the alkyl group is optionally substituted by at least one halogen or by one or more aryl group,
(C) at least one catalyst C consisting of at least one metal or compound, from the platinum group,
(D) at least one reinforcing silica filler D which is at least partly surface treated with one or more surface treatment agents,
(E) at least one organopolysiloxane having an aryl group E, wherein the organopolysiloxane having an aryl group E is an organopolysiloxane containing siloxyl units of the formula (E-1):

$$[R^5_p R^6_q SiO_{(4-p-q)/2}]_n \quad (E-1)$$

in which
$R^5$ and $R^6$ are independently $C_1$-$C_{30}$ hydrocarbon-based group;
wherein
n is an integer greater than or equal to 1; p and q are independently 0, 1, 2 or 3; and p+q=1, 2 or 3;
wherein the organopolysiloxane having an aryl group E comprises at least one aryl group directly bonded to Si atom,
(F) optionally at least one crosslinking inhibitor F,
wherein the silicone composition has a thixotropic index greater than 3,
wherein the thixotropic index is obtained by measuring the viscosity at room temperature at two speeds differing by a factor of 10, and
the viscosity corresponds to the Newtonian dynamic viscosity magnitude at 25° C.; and
wherein the amount of aryl group is from 10% to 70% by weight, based on the total weight of organopolysiloxane having an aryl group E.

2. The silicone composition of claim 1 wherein the silicone composition comprises 0.3-30 wt % of at least one organopolysiloxane having an aryl group E with respect to the total weight of the silicone composition.

3. The silicone composition of claim 1, wherein the hydrocarbon-based group comprises 1 to 24 carbon atoms and is selected from linear, branched, or cyclic alkyl or alkenyl groups, or aryl group,
wherein the hydrocarbon-based group is optionally substituted by at least one halogen or aryl group,
wherein the aryl group is optionally substituted by at least one halogen or $C_1$-$C_6$-alkyl groups.

4. The silicone composition of claim 1, wherein the aryl group is selected from a group consisting of xylyl, tolyl and phenyl radicals.

5. The silicone composition of claim 1, wherein at least one of groups $R^5$ and $R^6$ is an aryl group and others are an alkyl group comprising 1 to 8 carbon atoms or an alkenyl radical containing from 2 to 6 carbon atoms.

6. The silicone composition of claim 1, wherein the organopolysiloxane having an aryl group E comprises at least one aryl group, and at least one alkenyl group.

7. The silicone composition of claim 1, wherein the organopolysiloxane having an aryl group E comprises at least one aryl group, and at least one SiH group.

8. The silicone composition of claim 1, wherein the organopolysiloxane having an aryl group E comprises at least one aryl group, at least one alkenyl group, and at least one SiH group.

9. The silicone composition of claim 1, wherein the organopolysiloxane having an aryl group E has the viscosity ranging from 3-10 000 000 mPas.

10. The silicone composition of claim 1, wherein the reinforcing silica filler D is subjected to hydrophobic surface treatment.

11. The silicone composition of claim 1, wherein the amount of the silica reinforcing filler D is in the range from 2% to 40% by weight of the total composition.

12. The silicone composition of claim 1, wherein the silicone composition comprises, per 100% weight of the silicone composition:
from 10 to 95 wt % of at least one organopolysiloxane compound A;
from 0.1 to 40 wt % of at least one organohydrogenopolysiloxane compound B;
from 5 to 35 wt % of at least one reinforcing silica filler D which is at least partly surface treated;
from 0.8 to 20 wt % of at least one organopolysiloxane having an aryl group E;
from 0.002 to 0.01 wt % of catalyst; and
from 0.01 to 2 wt % of at least one crosslinking inhibitor F.

13. The silicone composition of claim 1, wherein the silicone composition comprises, per 100% weight of the silicone composition:
from 20 to 85 wt % of at least one organopolysiloxane compound A;
from 0.1 to 15 wt % of at least one organohydrogenopolysiloxane compound B;
from 10 to 30 wt % of at least one reinforcing silica filler D which is at least partly surface treated
from 1.0 to 15 wt % of at least one organopolysiloxane having an aryl group E;
from 0.0002 to 0.01 wt % of catalyst; and
from 0.01 to 1 wt % of at least one crosslinking inhibitor F.

14. The silicone composition of claim 1, wherein the amount of aryl group is from 215% to 70% by weight based on the total weight of organopolysiloxane having an aryl group E.

15. A method for additive manufacturing a silicone elastomer article comprising:
1. Printing a first silicone composition on a substrate with a 3D printer selected from an extrusion 3D printer or a material jetting 3D printer to form a first layer,
2) printing a second silicone composition on the first or previous layer with the said 3D printer to form a subsequent layer and
3) optionally repeating 2) with independently selected silicone composition for any additional layer needed and
4) Allowing the first and subsequent layers to crosslink, optionally by heating, to obtain a silicone elastomer article,
wherein at least one layer of said silicone composition is the silicone composition as defined in claim 1.

16. The method of claim 15, wherein the 3D printer is an extrusion 3D printer.

17. A silicone elastomer article produced by the method of claim 15.

18. A product comprising a silicone composition of claim 1 crosslinkable through one or more addition reactions with a 3D printer, optionally selected from an extrusion 3D printer or a material jetting 3D printer.

19. The silicone composition of claim 1, wherein the organopolysiloxane having an aryl group E is selected from the group consisting of E-I, E-II, E-III, E-IV, E-V, E-VI, and E-VII,

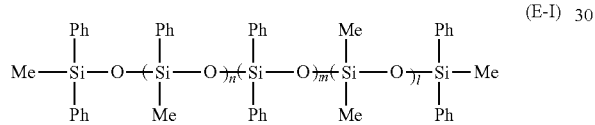
(E-I)

-continued

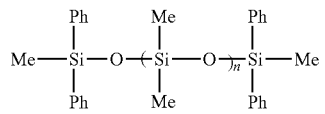
(E-II)

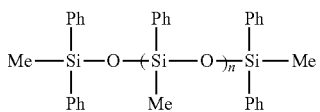
(E-III)

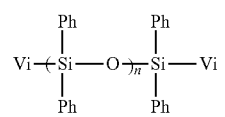
(E-IV)

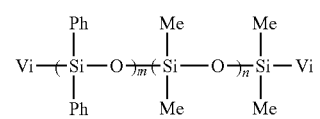
(E-V)

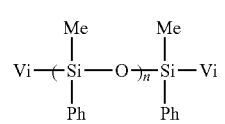
(E-VI)

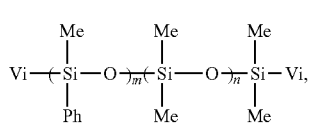
(E-VII)

wherein Me represents methyl group, Ph represents phenyl group and Vi represents vinyl group.

* * * * *